(12) United States Patent
Naaman et al.

(10) Patent No.: US 8,594,702 B2
(45) Date of Patent: Nov. 26, 2013

(54) CONTEXT SERVER FOR ASSOCIATING INFORMATION BASED ON CONTEXT

(75) Inventors: Mor Naaman, San Francisco, CA (US); Marc E. Davis, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1217 days.

(21) Appl. No.: 11/593,869

(22) Filed: Nov. 6, 2006

(65) Prior Publication Data

US 2008/0126961 A1   May 29, 2008

(51) Int. Cl.
*H04W 24/00* (2009.01)
(52) U.S. Cl.
USPC .................................. 455/456.2; 705/14.49
(58) Field of Classification Search
USPC ............. 455/456.2, 456.3, 456.1, 414.1, 425, 455/518; 715/764; 726/2; 707/E17.141; 705/14.61, 14.49; 701/211
See application file for complete search history.

(56) References Cited

U.S. PATENT DOCUMENTS

| | | | |
|---|---|---|---|
| 5,446,891 A | 8/1995 | Kaplan et al. |
| 5,493,692 A | 2/1996 | Theimer et al. |
| 5,583,763 A | 12/1996 | Ateheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz et al. |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |

(Continued)

FOREIGN PATENT DOCUMENTS

| | | |
|---|---|---|
| EP | 1362302 | 11/2003 |
| JP | 2002312559 | 10/2002 |

(Continued)

OTHER PUBLICATIONS

Davis, M. (Date Unknown). "Mobile Media Metadata for Mobile Imaging," four pages.

(Continued)

*Primary Examiner* — Charles Appiah
*Assistant Examiner* — Alexander Yi
(74) *Attorney, Agent, or Firm* — James J. DeCarlo; Greenberg Traurig, LLP

(57) ABSTRACT

A system, method, and computer readable medium are provided for associating information (including information and services) based upon context. In one example, an apparatus includes interface logic for receiving, during a session (e.g., during a media object capture, upload session, data transfer session, or the like), context information from a user device, and user-generated information associated with the context information. The context information may relate to time, date, location, ambient conditions, biometric (e.g., relating to the user of the device), device/user identification, or combinations thereof. The apparatus further including association logic for associating service information, different from the context information, with the user-generated information based on the context information. The associated service information may include empirical information such as a map of a particular location, the map including points of interest.

68 Claims, 5 Drawing Sheets

(56) References Cited

U.S. PATENT DOCUMENTS

| | | | |
|---|---|---|---|
| 6,157,924 A | 12/2000 | Austin | |
| 6,169,992 B1 | 1/2001 | Beall et al. | |
| 6,212,552 B1 | 4/2001 | Biliris et al. | |
| 6,266,667 B1 | 7/2001 | Olsson | |
| 6,314,365 B1 | 11/2001 | Smith | |
| 6,314,399 B1 | 11/2001 | Deligne et al. | |
| 6,324,519 B1 | 11/2001 | Eldering | |
| 6,327,590 B1 | 12/2001 | Chidlovskii et al. | |
| 6,446,065 B1 | 9/2002 | Nishioka et al. | |
| 6,490,698 B1 | 12/2002 | Horvitz et al. | |
| 6,502,033 B1 | 12/2002 | Phuyal | |
| 6,523,172 B1 | 2/2003 | Martinez-Guerra et al. | |
| 6,571,279 B1 | 5/2003 | Herz et al. | |
| 6,601,012 B1 | 7/2003 | Horvitz et al. | |
| 6,662,195 B1 | 12/2003 | Langseth et al. | |
| 6,665,640 B1 | 12/2003 | Bennett et al. | |
| 6,694,316 B1 | 2/2004 | Langseth et al. | |
| 6,701,311 B2 | 3/2004 | Biebesheimer et al. | |
| 6,701,315 B1 | 3/2004 | Austin | |
| 6,708,203 B1 | 3/2004 | Makar et al. | |
| 6,731,940 B1 | 5/2004 | Nagendran | |
| 6,741,980 B1 | 5/2004 | Langseth et al. | |
| 6,757,661 B1 | 6/2004 | Blaser et al. | |
| 6,773,344 B1 | 8/2004 | Gabai et al. | |
| 6,781,920 B2 | 8/2004 | Bates et al. | |
| 6,785,670 B1 | 8/2004 | Chiang et al. | |
| 6,789,073 B1 | 9/2004 | Lunenfeld | |
| 6,813,501 B2 | 11/2004 | Kinnunen et al. | |
| 6,816,850 B2 | 11/2004 | Culliss | |
| 6,829,333 B1 | 12/2004 | Frazier | |
| 6,834,195 B2 | 12/2004 | Brandenberg et al. | |
| 6,842,761 B2 | 1/2005 | Diamond et al. | |
| 6,845,370 B2 | 1/2005 | Burkey et al. | |
| 6,850,252 B1 | 2/2005 | Hoffberg | |
| 6,853,913 B2 | 2/2005 | Cherveny et al. | |
| 6,853,982 B2 | 2/2005 | Smith et al. | |
| 6,882,977 B1 | 4/2005 | Miller | |
| 6,904,160 B2 | 6/2005 | Burgess | |
| 6,931,254 B1 | 8/2005 | Egner et al. | |
| 6,961,660 B2 | 11/2005 | Underbrink et al. | |
| 6,961,731 B2 | 11/2005 | Holbrook | |
| 6,985,839 B1 | 1/2006 | Motamedi et al. | |
| 7,010,492 B1 | 3/2006 | Bassett et al. | |
| 7,027,801 B1 | 4/2006 | Hall et al. | |
| 7,058,508 B2 | 6/2006 | Combs et al. | |
| 7,058,626 B1 | 6/2006 | Pan et al. | |
| 7,062,510 B1 | 6/2006 | Eldering | |
| 7,065,345 B2 | 6/2006 | Carlton et al. | |
| 7,065,483 B2 | 6/2006 | Decary et al. | |
| 7,069,308 B2 | 6/2006 | Abrams | |
| 7,073,129 B1 * | 7/2006 | Robarts et al. | 715/740 |
| 7,110,776 B2 | 9/2006 | Sambin | |
| 7,143,091 B2 | 11/2006 | Charnock et al. | |
| 7,149,696 B2 | 12/2006 | Shimizu et al. | |
| 7,181,438 B1 | 2/2007 | Szabo | |
| 7,185,286 B2 | 2/2007 | Zondervan | |
| 7,194,512 B1 | 3/2007 | Creemer et al. | |
| 7,203,597 B2 | 4/2007 | Sato et al. | |
| 7,209,915 B1 | 4/2007 | Taboada et al. | |
| 7,219,013 B1 | 5/2007 | Young et al. | |
| 7,236,969 B1 | 6/2007 | Skillen et al. | |
| 7,254,581 B2 | 8/2007 | Johnson et al. | |
| 7,257,570 B2 | 8/2007 | Riise et al. | |
| 7,305,445 B2 | 12/2007 | Singh et al. | |
| 7,320,025 B1 | 1/2008 | Steinberg et al. | |
| 7,343,364 B2 | 3/2008 | Bram et al. | |
| 7,395,507 B2 | 7/2008 | Robarts et al. | |
| 7,404,084 B2 | 7/2008 | Fransdonk | |
| 7,437,312 B2 | 10/2008 | Bhatia et al. | |
| 7,451,102 B2 | 11/2008 | Nowak | |
| 7,461,168 B1 | 12/2008 | Wan | |
| 7,496,548 B1 | 2/2009 | Ershov | |
| 7,522,995 B2 | 4/2009 | Nortrup | |
| 7,529,811 B2 | 5/2009 | Thompson | |
| 7,562,122 B2 | 7/2009 | Oliver et al. | |
| 7,577,665 B2 | 8/2009 | Rameer et al. | |
| 7,584,215 B2 | 9/2009 | Saari et al. | |
| 7,624,104 B2 | 11/2009 | Berkhin et al. | |
| 7,624,146 B1 | 11/2009 | Brogne et al. | |
| 7,634,465 B2 | 12/2009 | Sareen et al. | |
| 7,657,907 B2 | 2/2010 | Fennan et al. | |
| 7,681,147 B2 | 3/2010 | Richardson-Bunbury et al. | |
| 7,725,492 B2 | 5/2010 | Sittig et al. | |
| 7,729,901 B2 | 6/2010 | Richardson-Bunbury et al. | |
| 7,769,740 B2 | 8/2010 | Martinez | |
| 7,769,745 B2 | 8/2010 | Naaman | |
| 7,783,622 B1 | 8/2010 | Vandermolen et al. | |
| 7,792,040 B2 | 9/2010 | Nair | |
| 7,802,724 B1 | 9/2010 | Nohr | |
| 7,822,871 B2 | 10/2010 | Stolorz et al. | |
| 7,831,586 B2 | 11/2010 | Reitter et al. | |
| 7,865,308 B2 | 1/2011 | Athsani | |
| 7,925,708 B2 | 4/2011 | Davis | |
| 2001/0013009 A1 | 8/2001 | Greening et al. | |
| 2001/0035880 A1 | 11/2001 | Musatov et al. | |
| 2001/0047384 A1 | 11/2001 | Croy | |
| 2001/0052058 A1 | 12/2001 | Ohran | |
| 2002/0014742 A1* | 2/2002 | Conte et al. | 273/460 |
| 2002/0019849 A1 | 2/2002 | Tuvey et al. | |
| 2002/0019857 A1 | 2/2002 | Harjanto | |
| 2002/0023091 A1 | 2/2002 | Silberberg et al. | |
| 2002/0023230 A1 | 2/2002 | Bolnick et al. | |
| 2002/0035605 A1 | 3/2002 | McDowell et al. | |
| 2002/0049968 A1 | 4/2002 | Wilson et al. | |
| 2002/0052786 A1 | 5/2002 | Kim et al. | |
| 2002/0052875 A1 | 5/2002 | Smith et al. | |
| 2002/0054089 A1 | 5/2002 | Nicholas | |
| 2002/0065844 A1 | 5/2002 | Robinson et al. | |
| 2002/0069218 A1 | 6/2002 | Sull et al. | |
| 2002/0099695 A1 | 7/2002 | Abajian et al. | |
| 2002/0103870 A1 | 8/2002 | Shouji | |
| 2002/0111956 A1 | 8/2002 | Yeo et al. | |
| 2002/0112035 A1 | 8/2002 | Carey | |
| 2002/0133400 A1 | 9/2002 | Terry et al. | |
| 2002/0138331 A1 | 9/2002 | Hosea et al. | |
| 2002/0152267 A1 | 10/2002 | Lennon | |
| 2002/0169840 A1 | 11/2002 | Sheldon et al. | |
| 2002/0173971 A1 | 11/2002 | Stirpe et al. | |
| 2002/0178161 A1 | 11/2002 | Brezin et al. | |
| 2002/0198786 A1 | 12/2002 | Tripp et al. | |
| 2003/0008661 A1 | 1/2003 | Joyce et al. | |
| 2003/0009367 A1 | 1/2003 | Morrison | |
| 2003/0009495 A1 | 1/2003 | Adjaoute | |
| 2003/0027558 A1 | 2/2003 | Eisinger | |
| 2003/0032409 A1 | 2/2003 | Hutcheson et al. | |
| 2003/0033331 A1 | 2/2003 | Sena et al. | |
| 2003/0033394 A1 | 2/2003 | Stine et al. | |
| 2003/0065762 A1 | 4/2003 | Stolorz et al. | |
| 2003/0069877 A1 | 4/2003 | Grefenstette et al. | |
| 2003/0069880 A1 | 4/2003 | Harrison et al. | |
| 2003/0078978 A1 | 4/2003 | Lardin et al. | |
| 2003/0080992 A1 | 5/2003 | Haines | |
| 2003/0126250 A1 | 7/2003 | Jhanji | |
| 2003/0149574 A1 | 8/2003 | Rudman | |
| 2003/0154293 A1 | 8/2003 | Zmolek | |
| 2003/0165241 A1 | 9/2003 | Fransdonk | |
| 2003/0191816 A1 | 10/2003 | Landress et al. | |
| 2004/0010492 A1 | 1/2004 | Zhao et al. | |
| 2004/0015588 A1 | 1/2004 | Cotte | |
| 2004/0030798 A1 | 2/2004 | Andersson et al. | |
| 2004/0034752 A1 | 2/2004 | Ohran | |
| 2004/0043758 A1 | 3/2004 | Sorvari et al. | |
| 2004/0044736 A1 | 3/2004 | Austin-Lane et al. | |
| 2004/0070602 A1* | 4/2004 | Kobuya et al. | 345/738 |
| 2004/0139025 A1 | 7/2004 | Coleman | |
| 2004/0139047 A1 | 7/2004 | Rechsteiner | |
| 2004/0148341 A1 | 7/2004 | Cotte | |
| 2004/0152477 A1 | 8/2004 | Wu et al. | |
| 2004/0183829 A1 | 9/2004 | Kontny et al. | |
| 2004/0201683 A1 | 10/2004 | Murashita et al. | |
| 2004/0203851 A1 | 10/2004 | Vetro et al. | |
| 2004/0203909 A1 | 10/2004 | Koster | |
| 2004/0209602 A1 | 10/2004 | Joyce et al. | |
| 2004/0243623 A1 | 12/2004 | Ozer et al. | |

(56) References Cited

U.S. PATENT DOCUMENTS

| | | |
|---|---|---|
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan |
| 2005/0149397 A1 | 7/2005 | Morgenstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1* | 9/2005 | Kaplan .................. 455/456.1 |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1* | 11/2006 | Granito et al. .......... 455/456.1 |
| 2006/0282455 A1 | 12/2006 | Lee |
| 2007/0013560 A1 | 1/2007 | Casey |
| 2007/0015519 A1 | 1/2007 | Casey |
| 2007/0043766 A1 | 2/2007 | Nicholas et al. |
| 2007/0061300 A1* | 3/2007 | Ramer et al. .................. 707/3 |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0232292 A1* | 10/2007 | Larocca .................. 455/425 |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1 | 5/2008 | Martinez et al. |
| 2008/0120690 A1 | 5/2008 | Norlander et al. |
| 2008/0133750 A1 | 6/2008 | Grabarnik et al. |
| 2008/0147655 A1 | 6/2008 | Sinha et al. |
| 2008/0147743 A1 | 6/2008 | Taylor et al. |
| 2008/0148175 A1 | 6/2008 | Naaman et al. |
| 2008/0154720 A1 | 6/2008 | Gounares |
| 2008/0163284 A1 | 7/2008 | Martinez et al. |
| 2008/0172632 A1 | 7/2008 | Stambaugh |
| 2008/0177706 A1 | 7/2008 | Yuen |
| 2008/0270579 A1 | 10/2008 | Herz et al. |
| 2008/0285886 A1 | 11/2008 | Allen |
| 2008/0301250 A1 | 12/2008 | Hardy et al. |

(56) References Cited

U.S. PATENT DOCUMENTS

| | | |
|---|---|---|
| 2008/0320001 A1 | 12/2008 | Gaddam |
| 2009/0005987 A1 | 1/2009 | Vengroff et al. |
| 2009/0006336 A1 | 1/2009 | Forstall et al. |
| 2009/0012934 A1 | 1/2009 | Yerigan |
| 2009/0012965 A1 | 1/2009 | Franken |
| 2009/0043844 A1 | 2/2009 | Zimmet et al. |
| 2009/0044132 A1 | 2/2009 | Combel et al. |
| 2009/0063254 A1 | 3/2009 | Paul et al. |
| 2009/0070186 A1 | 3/2009 | Buiten et al. |
| 2009/0073191 A1 | 3/2009 | Smith et al. |
| 2009/0076889 A1 | 3/2009 | Jhanji |
| 2009/0100052 A1 | 4/2009 | Stern et al. |
| 2009/0106356 A1 | 4/2009 | Brase et al. |
| 2009/0125517 A1 | 5/2009 | Krishnaswamy et al. |
| 2009/0132941 A1 | 5/2009 | Pilskalns et al. |
| 2009/0144141 A1 | 6/2009 | Dominowska et al. |
| 2009/0150501 A1 | 6/2009 | Davis et al. |
| 2009/0150507 A1 | 6/2009 | Davis et al. |
| 2009/0165051 A1 | 6/2009 | Armaly |
| 2009/0171939 A1 | 7/2009 | Athsani et al. |
| 2009/0177603 A1 | 7/2009 | Honisch |
| 2009/0187637 A1 | 7/2009 | Wu et al. |
| 2009/0204484 A1 | 8/2009 | Johnson |
| 2009/0204672 A1 | 8/2009 | Jetha et al. |
| 2009/0204676 A1 | 8/2009 | Parkinson et al. |
| 2009/0216606 A1 | 8/2009 | Coffman et al. |
| 2009/0222302 A1 | 9/2009 | Higgins |
| 2009/0222303 A1 | 9/2009 | Higgins |
| 2009/0234814 A1 | 9/2009 | Boerries et al. |
| 2009/0234909 A1 | 9/2009 | Strandeil et al. |
| 2009/0249482 A1 | 10/2009 | Sarathy |
| 2009/0265431 A1 | 10/2009 | Janie et al. |
| 2009/0281997 A1 | 11/2009 | Jain |
| 2009/0299837 A1 | 12/2009 | Steelberg et al. |
| 2009/0313546 A1 | 12/2009 | Katpelly et al. |
| 2009/0320047 A1 | 12/2009 | Khan et al. |
| 2009/0323519 A1 | 12/2009 | Pun |
| 2009/0328087 A1 | 12/2009 | Higgins et al. |
| 2010/0002635 A1 | 1/2010 | Eklund |
| 2010/0014444 A1 | 1/2010 | Ghanadan et al. |
| 2010/0063993 A1 | 3/2010 | Higgins et al. |
| 2010/0070368 A1 | 3/2010 | Choi et al. |
| 2010/0118025 A1 | 5/2010 | Smith et al. |
| 2010/0125563 A1 | 5/2010 | Nair et al. |
| 2010/0125569 A1 | 5/2010 | Nair et al. |
| 2010/0125604 A1 | 5/2010 | Martinez et al. |
| 2010/0125605 A1 | 5/2010 | Nair et al. |
| 2010/0185642 A1 | 7/2010 | Higgins et al. |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

Davis, M. et al. (Date Unknown). "From Context to Content: Leveraging Context for Mobile Media Metadata," seven pages.

Davis, M. et al. (Oct. 10-16, 2004). "From Context to Content: Leveraging Context to Infer Media Metadata," *MM'04*, New York, New York, eight pages.

Davis, M. et al. (Apr. 2-7, 2005). "MMM2: Mobile Media Metadata for Media Sharing," *CHI 2005*, Portland, Oregon, four pages.

Sarvas, R. et al. (Jun. 6-9, 2004). "Metadata Creation System for Mobile Images," *MobiSYS'04*, Boston, Massachusetts, thirteen pages.

Davis, M. et al. (Jun. 27-30, 2004). "Mobile Media Metadata for Mobile Imaging," *IEEE International Conference on Multimedia and Expo, 2004, ICME '04* 3:1707-1710.

Davis, M. et al. (Oct. 10-16, 2004). "From Context to Content: Leveraging Context for Mobile Media Metadata," *International Multimedia Conference Proceedings of the 12$^{th}$ Annual ACM International Conference on Multimedia*, pp. 1-7.

Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/>, last visited on Feb. 2, 2010, thirteen pages.

Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h> . . . , last visited on Feb. 2, 2010, ten pages.

Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.

Wooldridge, M. et al. (2005). "STALK. The Camera-phone Scavenger Hunt!" located at <http://www.stalk.com>, last visited on Dec. 28, 2009, two pages.

U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
U.S. Appl. No. 11/952,007, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.

(56) References Cited

OTHER PUBLICATIONS

U.S. Appl. No. 11/960,368, filed Dec. 19, 2007, Madsen.
U.S. Appl. No. 11/953,454, filed Dec. 10, 2007, Davis.
U.S. Appl. No. 11/953,494, filed Dec. 10, 2007, Davis.
U.S. Appl. No. 12/236,668, filed Sep. 24, 2008, Davis.
U.S. Appl. No. 12/059,594, filed Mar. 31, 2008, Martinez.
U.S. Appl. No. 12/057,878, filed Mar. 28, 2008, Martinez.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,345, filed Nov. 18, 2008, Nair.
U.S. Appl. No. 12/241,198, filed Sep. 30, 2008, Higgins.
U.S. Appl. No. 12/273,259, filed Nov. 18, 2008, Martinez.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/273,371, filed Nov. 18, 2008, Nair.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Nedos, A; Singh K., Clarke S, Proximity Based Group Communications for Mobile Ad Hoc Networks'; Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 12/273,317, filed Nov. 18, 2008, Rahul Nair.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology on a Wireless Handset", Qualcomm Inc., San Diego, Sep. 27, 2005; 3 pages.
MediaFlo, Flo Technology Overview, Qualcomm Inc. Copyright 2007; 24 pages.
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Perkowitz, Mike et al., "Utilizing Online Communities to Facilitate Physical World Interactions", The International Conference on Communities and Technologies, Sep. 19, 2003, Amsterdam, pp. 1-6.
Notification of Transmittal of The International Search Report and The Written Opinion of the International Search Authority, or Declaration (PCT/US2007/'084797) dated Mar. 21, 2008; 11 pages.

(56) References Cited

OTHER PUBLICATIONS

International Search Report (PCT/US2007/084807) dated May 27, 2008; 3 pages.

International Preliminary Report on Patentability (PCT/US2007/084807) dated May 26, 2009; 5 pages.

International Search Report (PCT/US2010/026063) dated May 27, 2008; 3 pages.

Rekimoto, et al., "CyberCode: designing augmented reality environments with visual tags." Proceedings of DARE 2000 on Designing augmented reality environments, Elsinore, Denmark, pp. 1-11 Apr. 12-14, 2000.

"Semacode-URL Barcodes-practical ubiquitous computing", located at http://semacode.org visited on Apr. 13, 2007; 3 pages.

"Technical White Paper: Choosing the best 2D barcode format for mobile apps," Semacode, Jul. 15, 2006; pp. 1-7 located at http://semacode.org/about/technical/whitepaper/best2_d_code.pdf.

Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.

Cooper, M. et al. (Nov. 2-8, 2003). "Temporal Event Clustering for Digital Photo Collections," MM'03 Berkeley, California, pp. 364-373.

Davis, M. et al. (Oct. 10-16, 2004). "From Context to Content: Leveraging Context to Infer Media Metadata," MM'04 New York, New York. 9 pages.

Davis, M. et al. "From Context to Content: Leveraging Context for Mobile Metadata." 9 pages.

Davis, M. et al. (Apr. 2-7, 2005). "MMM2: Mobile Media Metadata for Media Sharing," CHI 2005 Portland, Oregon. 4 pages.

Davis, M. et al. "Mobile Media Metadata for Mobile Imaging." Jun. 27-30, 2004; 4 pages.

Davis, M. et al. "Using Context and Similarity for Face and Location Identification." 10 pages.

Flickr. "Welcome to Flickr—Photo Sharing," located at <http://www.flickr.com > visited on Feb. 26, 2007, one page.

Gargi, U. (Aug. 7, 2003). "Consumer Media Capture: Time-Based Analysis and Event Clustering," Technical Report HPL-2003-165 HP Laboratories Palo Alto, pp. 1-15.

Goldberger, J. et al. "The Hungarian Clustering Method," located at <http://scholar.googles.com/scholar?num=20&h1=en&lr=&9=cache:vbwslsm1CisJ:www.openu .acil/Personal_sites/tarnirtassa/Publications/hcm.pdf+goldgerger+clustering+method+hungarian> visited on Mar. 1, 2007, twelve pages.

Graham, A. et al. (Jul. 13-17, 2002). "Time as Essence for Photo Browsing Through Personal Digital Libraries," JCDL '02 Portland, Oregon. 11 pages.

Jaffe, A. et al. (May 23-26, 2006). "Generating Summaries for Large Collections of Geo-Referenced Photographs," WWW 2006 Edinburgh, Scotland. 2 pages.

Jaffe, A. et al. (Oct. 26-27, 2006). "Generating Summaries and Visualization for Large Collections of Geo-Referenced Photographs," MIR '06 Santa Barbara, California. 11 pages.

Joshi, D. et al. (Oct. 15-16, 2004). "The Story Picturing Engine: Finding Elite Images to Illustrate a Story Using Miitual Reinforcement," MIR '04 New York, New York. 9 pages.

Naaman, M. et al. (Nov. 2003). "From Where to What: Metadata Sharing for Digital Photographs with Geographic Coordinates," In on the Move to Meaningful Internet Systems 2003: Coop/S, DOA, and OSBASE R. Meersman et al. eds., pp. 196-217.

Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.

Nair, R. et al. (Nov. 6-11, 2005). "Photo L01: Browsing Multi-User Photo Collections," MM'05 Singapore, pp. 223-224.

O'Hare, N. et al. "Combination of Content Analysis and Context Features for Digital Photograph Retrieval." 7 pages.

Pigeau, A. et al. (Jun. 17, 2005). "Organizing a Personal Image Collection with Statistical Model-Based ICL Clustering on Spatio-Temporal Camera Phone Meta-Data." 25 pages.

Sarvas, R. et al. (Jun. 6-9, 2004). "Metadata Creation System for Mobile Images," MobiSys'04 Boiton, Massachusetts, pp. 36-48.

Toyama, K. et al. (Nov. 2-8, 2003). "Geographic Location Tags on Digital Images," MM'03'Berkeley: California. 12 pages.

Almieda, R.B. et al. "A Community-Aware Search Engine," WWW2004, New York., NY, May 17-22, 2004, pp. 413-421.

Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.

Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.

Bharat, K. (Date Unknown). "SearchPad: Explicit Capture of Search Context to Support Web Search,"located at <http://www9.org/w9cdrom/173/173.html >, last visited Aug. 1, 2007, 13 pages.

Budzik, J. et al. (2000). "User Interactions with Everyday Applications as Context for Just-in-Time Information Access,"Proceeding of the 2000 Conference on Intelligent User Interfaces, eight pages.

Finkelstein, L. et al. (2001). "Placing Search in Context: The Concept Revisited," WWW/O, Hong Kong, May 2-5, 2001, pp. 406-414.

Freyne, J. et al. (2004). "Further Experiments on Collaborative Ranking in Community-Based Web Search,"Artificial Intelligence Review, pp. 1-23.

Lieberman, H. (1995) "Letizia: An Agent that Assists Web Browsing," Proceedings of the Fourteenth International Joint Conference on Artificial Intelligence, Aug. 20-25, 1995, six pages.

Mitra, M. et al. (1998). "Improving Automatic Query Expansion," Proceedings of the AMC SIGIR, nine pages.

Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.

Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.

Yahoo! Inc. (Dec. 7, 2005). "Yahoo! Widget Engine 3.0 Reference Manual Version 3.0," 300 pages.

U.S. Appl. No. 12/407,690, filed Mar. 19, 2009; 50 pages.

U.S. Appl. No. 12/407,681, filed Mar. 19, 2009; 56 pages.

International Search Report PCT/US2008/088228 dated Sep. 30, 2009—2 pages.

Written Opinion PCT/US2008/088228 dated Sep. 30, 2009—5 pages.

U.S. Appl. No. 11/593,668, filed Nov. 6, 2006 for Naaman, et al.

U.S. Appl. No. 11/593,869, filed Nov. 6, 2006 for Naaman, et al.

"Gutenkarte" Book Catalog, 2006 MetaCarta, Inc., www.gutenkarte.org 11pgs.

Baron, N.S. et al. (Aug. 30, 2005). "Tethered or Mobile? Use of Away Messages in Instant Messaging by American College Students," Chapter 20.1 in Mobile Communication, Springer: London, England, 31:293-297.

Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.

Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h >. . . , last visited on Feb. 2, 2010, ten pages.

(56) References Cited

OTHER PUBLICATIONS

Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p. . . ,> last visited on Feb. 2, 2010, seventeen pages.

Wooldridge, M. et al. (2005). "STALK. The Camera-phone Scavenger Hunt!" located at <http://www.stalk.com >, last visited on Dec. 28, 2009, two pages.

www.stalk.com (retrieved on Dec. 29, 2009) pp. 1-2.

Anonymous. (Date Unknown). "CommunityWalk—About," located at <http://www.communitywalk.com/about >, last visited on Mar. 3, 2008, one page.

Anonymous. (Date Unknown). "CommuinityWalk Mapping Made Easy," located at <http://www.communitywalk.com/>, last visited on Mar. 3, 2008, one page.

Anonymous. (Date Unknown). "Google Earth User Guide" located at <http://earth.google.com/userguide/v4/>, last visited on Feb. 27, 2008, twelve pages.

Anonymous. (Date Unknown). "Google Earth—Wikipedia, the Free Encyclopedia," located at <http://en.wikipedia.org/wiki/Google_earth >, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html >, nine pages.

Anonymous. (Date Unknown). "Google Maps," located at <http://en.wikipedia.org/wiki/Google_maps >, last visited on Feb. 27, 2008, eleven pages.

Anonymous. (Date Unknown). "Live Search Maps, " located at <http://en.wikipedia.org/wiki/Windows_live_maps >, last visited on Mar. 3, 2008, six pages.

Anonymous. (Date Unknown). "WikiMapia," located at <http://en.wikipedia.org/wiki/WikiMapia >, last visited on Mar. 3, 2008, three pages.

Anonymous. (2007). "Ask.com Maps & Directions," located at <http://maps.ask.com/maps >, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com >, last visited on Mar. 3, 2008, one page.

Anonymous. (2008). "Wikimpaia.org ," located at <http://wikimpaia.org/>, last visited on Mar. 3, 2008, one page.

* cited by examiner

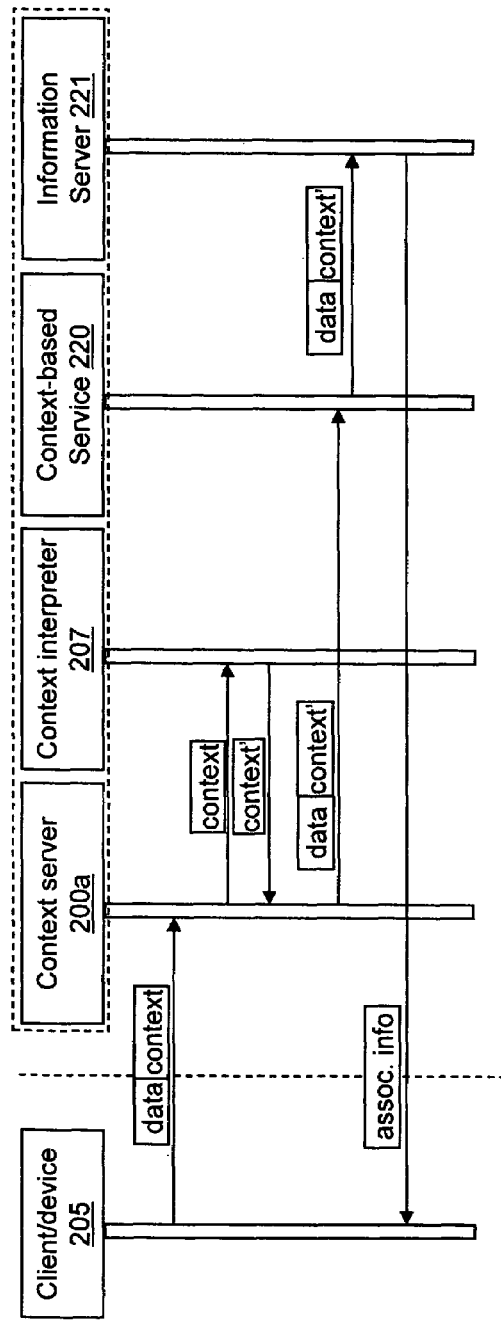
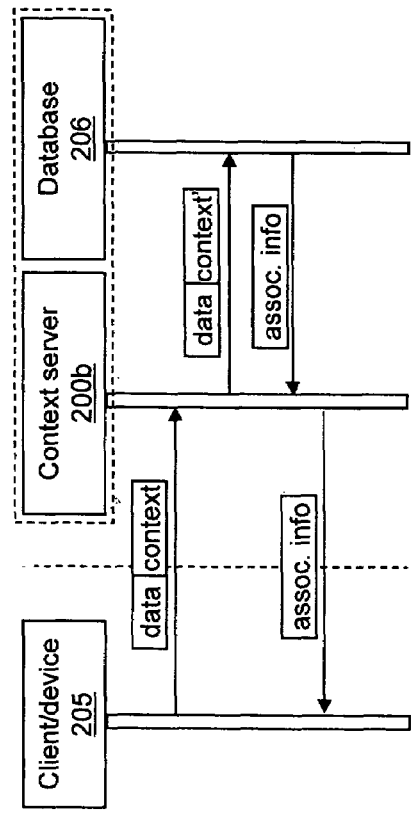
Figure 3A
Figure 3B

CONTEXT SERVER FOR ASSOCIATING INFORMATION BASED ON CONTEXT

BACKGROUND

1. Field

The present invention generally relates to associating information or services based upon the context of a user or user device, and in one example, to providing associated information or services based upon context to one or more users.

2. Related Art

Mobile devices, such as mobile phones including digital cameras, are becoming ever more prevalent. Such mobile devices are increasingly capable of determining the context of the environment in which they are used. For example, in addition to time and date information, location services may be used to supply spatial information of the device, for example, GSM network cell ID, EOTD-based location, GPS, and the like. Additionally, such spatial information may be associated with digital photographs captured by a mobile device including a digital camera, thereby providing spatial context for digital photographs.

Some context information, typically time and date information, may be automatically generated by a device (referred to generally as device-generated data) and associated with a digital photograph. For example, a mobile phone having a digital camera may automatically generate time and date metadata associated with the capture of a digital photograph. Additionally, semantic information may be entered by a user at the time of capture (or later) and associated with the digital photograph. Such information is often referred to as user-generated metadata, or tags, and may include various user inputted information.

It is desired to associate information and/or service(s) based on received device-generated and/or user-generated context information, which may be associated with a media object such as a digital photograph. Further, it is desired to provide such associated service(s) and/or information to one or more users or user devices.

BRIEF SUMMARY

According to one aspect of the present invention a system for associating information (including information and services) based upon context is provided. In one example, an apparatus includes interface logic for receiving, during a session (e.g., during a media object capture, upload session, or data transfer session), context information from a user device, and user-generated subjective characterization information associated with the context information. The context information may relate to time, date, location, ambient conditions, biometric (e.g., relating to the user of the device), device/user identification, or combinations thereof. The apparatus further including association logic for associating service information, different from the context information, with the user-generated subjective characterization information based on the context information. The associated service information may include empirical information such as a map of a particular location.

In some examples, the apparatus further comprises service logic for providing the associated service information to at least one user based on the association of service information with the user-generated subjective characterization information or the context. The at least one user may include a user other than a first user who created the user-generated subjective characterization information. The service information may be based on a plurality of inputs (e.g., context or user-generated subjective characterization information) from multiple user devices. The association logic may associate the service information with user-generated subjective characterization information and context information from a plurality of user devices.

The context information from the user device may originate at the user device or at a device other than the user device. The service information may relate to various information or services, such as a scavenger hunt game (or reverse scavenger hunt, e.g., where a user is provided with an image and requested to find a location associated with the image), a travel log (e.g., including a map overlaid with at least one media object associated with the user), and a travel guide for providing a suggestion or tour to a user device.

The service information may further relate to an advertisement, where the advertisement is based on context information. In one example, the service information relates to a sponsored search, where the apparatus includes logic for initiating a transfer of an advertisement to a user device based on the context information and a user search query received from the user device.

According to another aspect and example, a method for associating information based upon context is provided. In one example, the method includes receiving context information from a user device, and user-generated subjective characterization information associated with the context information, wherein the context information and user-generated subjective characterization information are received during a common session (e.g., a media object capture session). The method further includes associating service information, different from the context information, with the user-generated subjective characterization information based on the context information. The associated service information may include empirical information such as a map of a particular location. The context information may relate to time, date, location, ambient conditions, biometric (e.g., relating to the user of the device), device/user identifications, or combinations thereof.

According to another aspect and example, a computer-readable medium or product encoded with computer program instructions for associating information based upon context is provided. In one example, the process includes receiving context information from a user device, and user-generated subjective characterization information associated with the context information, wherein the context information and user-generated subjective characterization information are received during a common session (e.g., a media object capture session). The process further including associating service information, different from the context information, with the user-generated subjective characterization information based the context information. The associated service information may include empirical information such as a map of a particular location. The context information may relate to time, date, location, biometric (e.g., relating to the user of the device), or combinations thereof.

According to another aspect of the present invention a system for associating information (including information or services) based upon context is provided. In one example, an apparatus operates to associate information with a media object based upon context. The apparatus includes interface logic for receiving, during a session (e.g., associated with the media object capture, an upload session, data transfer session, or the like), a media object from a user device, context information from the user device (e.g., where the context information is not user-generated) and user-generated information from the user device (e.g., where the user-generated information is related to the media object). The apparatus further comprising association logic for associating information, different from the user-generated information, with the media object based on the context information and the user-generated information.

In one example, the associated information is of a type different than related device-generated metadata, e.g., different than device generated formatting data, and in another example different than the media object. In one example, the context information does not include only formatting data (e.g., EXIF data or the like) for the media object.

The apparatus may further include service logic for providing the associated information to at least one user based on the association of information with the media object. The at least one user may include a first user associated with the media object or a second user, different than the first user. The apparatus may further include permissions logic for enabling a first user to grant a second user access. In one example, the associated information is based on a plurality of inputs from multiple user devices. The inputs may comprise user-generated and/or device-generated context information.

The service information may further relate to a map, travel guide, tour, context-based message, advertisement, sponsored search advertisement, game such as a scavenger hunt, or combinations thereof.

According to another example, a method for associating information with a media object based upon context is provided. In one example, the method includes receiving a media object, context information from the user device (e.g., where the context information is not user-generated), and user-generated information from the user device (e.g., where the user-generated information is related to the media object). The method further associating information with the media object based on the context information and the user-generated information.

According to another aspect and example, a computer-readable medium or product encoded with computer program instructions for associating information based upon context is provided. In one example, the process includes receiving a media object, context information from the user device (wherein the context information is not user-generated), and user-generated information from the user device (wherein the user-generated information is related to the media object). The process further associating information with the media object based on the context information and the user-generated information.

The various aspects and examples of the present invention are better understood upon consideration of the detailed description below in conjunction with the accompanying drawings and claims.

BRIEF DESCRIPTION OF THE DRAWINGS

FIGS. 3A and 3B illustrate exemplary information flows between a context server and a user device according to one example.

DETAILED DESCRIPTION

The following description is presented to enable a person of ordinary skill in the art to make and use the various aspects and examples of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

In some examples described herein, a context server apparatus is provided for facilitating the association of information based upon context of a user or user device. For example, the context server may include interface logic for receiving context information from or associated with a user device, as well as other user-generated information or objects such as media objects, user-generated information or metadata, subjective characterization information, and the like. The context server may include logic for associating information or services with one or more of the user-generated information, media object, or context information, and transmitting (or at least initiating the transfer of) the associated information or service to a server system or one or more users.

Figure 1:
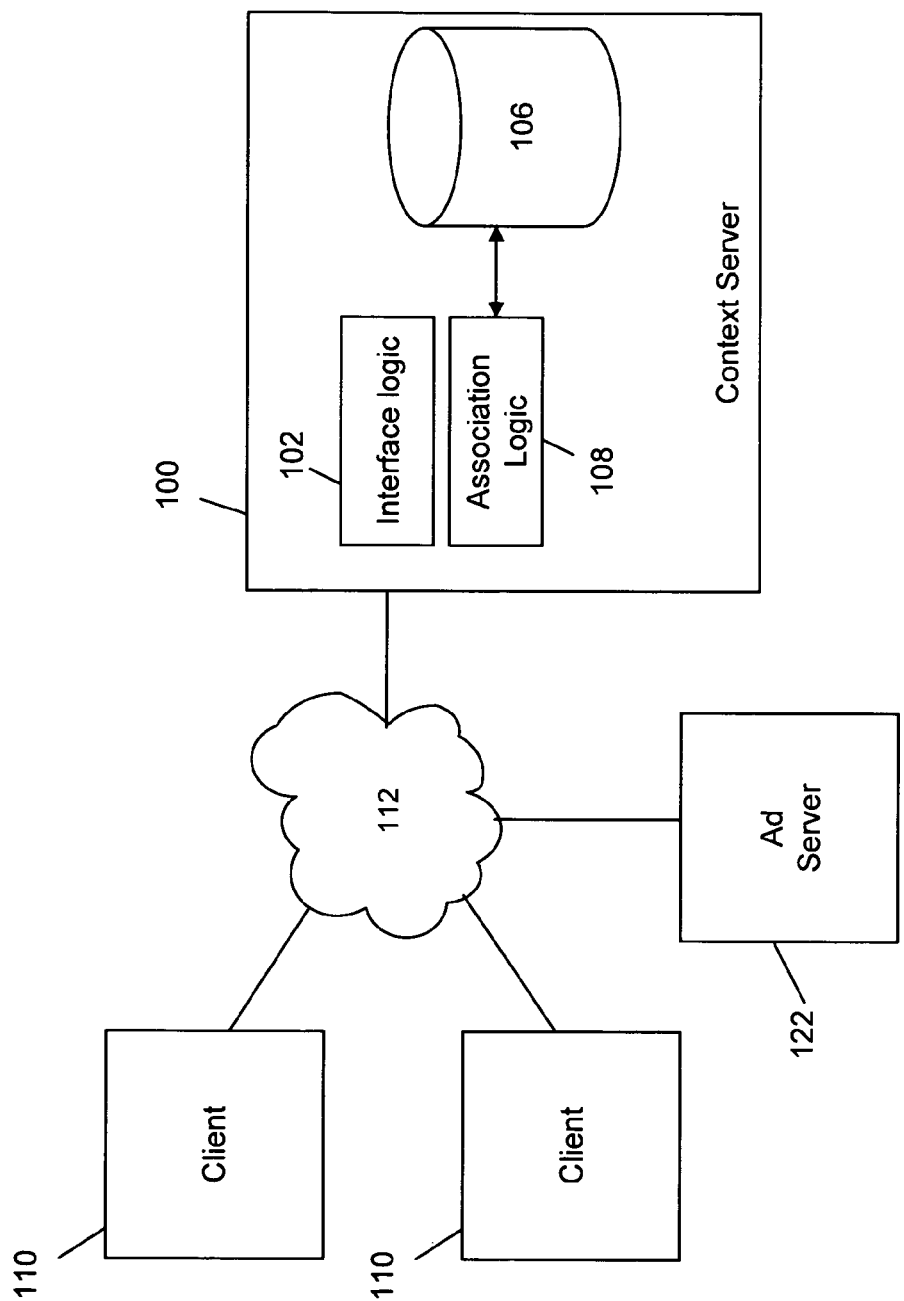
FIG. 1 illustrates an exemplary context server and environment in which some aspects and examples described may by used.

FIG. 1 illustrates an exemplary environment in which some examples of a context server apparatus and associated aspects described may be used. In particular, FIG. 1 illustrates a client-server system in which one or more clients 110 may communicate with a context server 100 via network 112. Context server 100 generally includes interface logic 102 for interfacing with network 112, and association logic 108 for associating information or services to one or more clients 110 based, at least in part, on received context information from one or more clients 110. Context server 100 may further include a database 106 for storing information including, for example, context information, media objects, and information or services for associating with data based on the context. As will be described, database 106 may be stored locally with context server 100 or remotely to context server 100.

Clients 110 and context server 100 may include suitable communication interfaces to communicate in part or in whole via network 112. Network 112 may include a Wide Area Network (WAN) such as the Internet, a wireless network, such as a wireless gateway, e.g., a cellular, satellite, or other wireless network, a non-wireless network such as a cable or fiber optic network, or a combination of wireless and non-wireless systems. Clients 110 and context server 100 may communicate, in part or in whole, via wireless or hardwired communications, such as Ethernet, IEEE 802.11b wireless, or the like. Additionally, communication between clients 110 and context server 100 may include (or access) various servers such as a media server, map server, mail server, mobile server, and the like. Client 110 for use with context server 100 may include a typical web browser application, a wireless application protocol (WAP) feature, or other data communication protocol associate with the device of client 110 suitable to communicate with context server 100.

In this example, context server 100 includes interface logic 102 for receiving context information, media objects, user input, and the like. To that end, media server 100 may utilize various wireless or Web data interface techniques such as Common Gateway Interface (CGI) protocol and associated applications (or "scripts"), Java® "servlets", i.e., Java® applications running on a wireless server, Web server, or the like to present information and receive input from clients 110. Context server 100, although described herein in the singular, may actually comprise plural computers, devices, backends, and the like, communicating (wired and/or wireless) and cooperating to perform some or all of the functions described herein. Additionally, context server 100 may be implemented in various fashions and include various hardware, software, or firmware to carry out the examples described herein.

Association logic 108 generally operates to associate information (e.g., service information, services, maps, advertisements, games, entertainment, travel logs, and so on) with information received from a client 110. For example, information may be associated with context information, user-generated information, media objects, or combinations thereof. Context server 100 may thereafter transfer (or initiate/direct the transfer of, e.g., via advertisement server 122) information to one or more clients 110 (which may or may not include the particular client 110 associated with the information received by context server 100).

Alternatively or additionally, context server 100 provides access of the received information or associated information to a third party service provide or server system, e.g., a photograph storage server system, mobile phone service provider, advertisement server, and so on, which may in turn communicate associated information with one or more clients 110 or provide one or more clients 110 access to such information.

Context server 100 may further include various other components known in the art, e.g., a scripting engine (such as a PHP scripting engine), an aggregation engine, and the like. A scripting engine may include authentication logic, upload logic, metadata processing logic, and permissions handling logic. The authentication logic authenticates a user signing on to the context server. The upload logic may be used or included with interface logic 102 to upload from a client to context server 100 data conforming to any media format, e.g., still image (e.g., JPEG, TIFF), video (e.g., MPEG, AVI), or audio (e.g., MP3, OGG). The aggregation engine may include a statistics engine and a search engine.

Metadata processing logic permits a user to enter user-generated metadata, for example, to describe a media object (as used herein, "metadata" may refer to one metadatum or plural metadata). Metadata may take the form of one or more tags for a media object. Other types of metadata include, e.g., a title, a description of the image, annotations, and comments. Additionally, metadata associated with a device (e.g., device-generated metadata) such as metadata from a digital camera that captured a digital photograph, including metadata regarding time of capture, aperture, shutter speed, and other settings. Such metadata may be extracted, for example, from the EXIF (Exchangeable Image File) header stored inside the uploaded file by many digital cameras, or the IPTC (International Press Telecommunications Council) header stored inside the uploaded file by many photograph management and organization software packages.

Additionally, metadata may include geographical reference data associated with the media object. For example, the device may generate a geographical location (e.g., from a GPS location device, cell identification, or other location technologies). Additionally or alternatively, a user may enter or edit geographical location associated with a particular media object (either at the time of capture or later).

For the sake of convenience, at times, digital photographs or still images captured by digital cameras are used and described as examples of media objects manipulated by the exemplary system; however, those skilled in the art will recognize that the various examples apply similarly or equally to other media objects, subject to appropriate modifications and use of other functions where appropriate (e.g., viewing a media object may apply to viewing a still or moving image, listening to an audio media object, such as a soundtrack, or combinations thereof).

Figure 2:
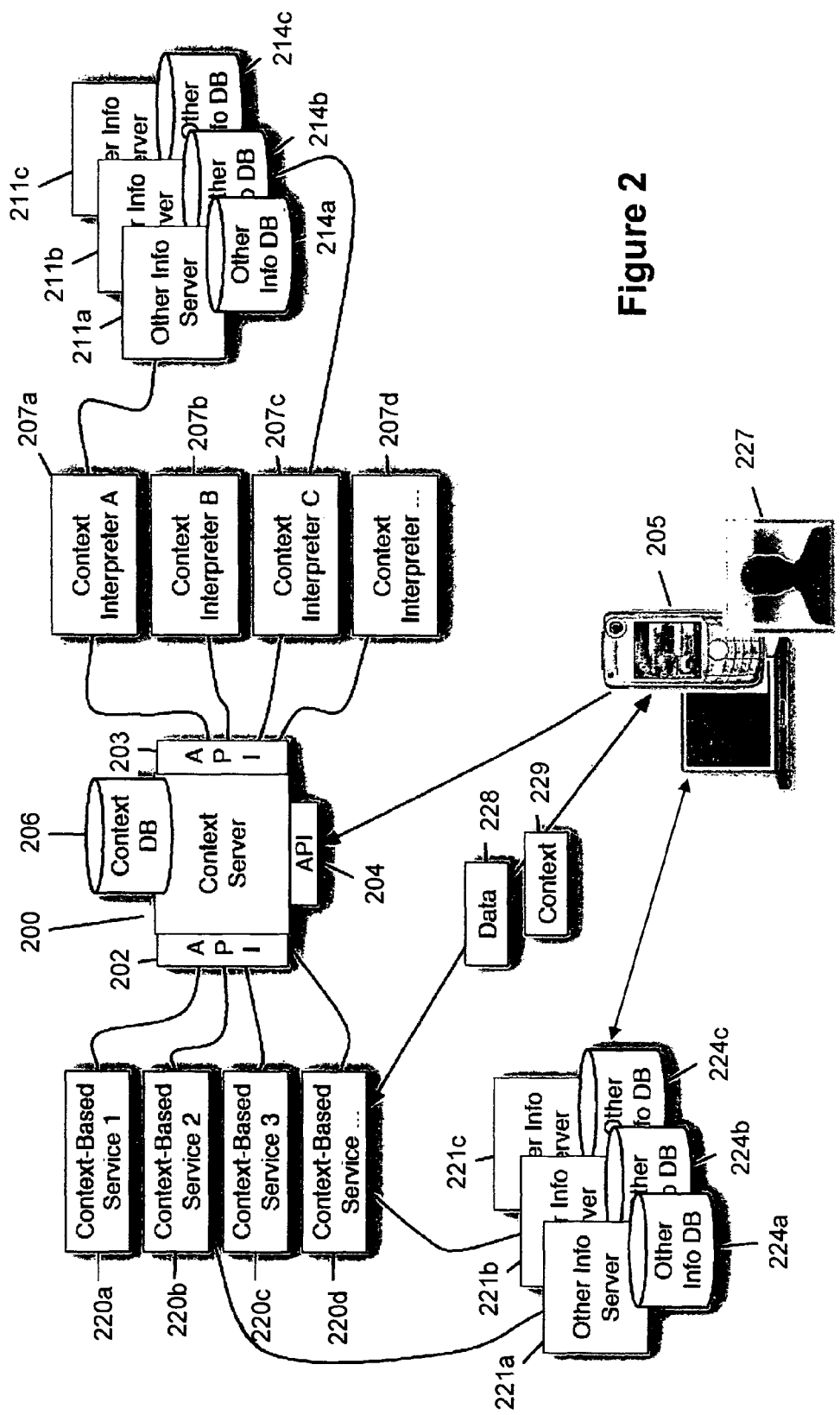
FIG. 2 illustrates an exemplary context server and associated components according to another example.

FIG. 2 illustrates an exemplary context server 200 in communication with a client device 205 and various exemplary components, which may be included locally with context server 200 or located remotely to context server 200. Additionally, FIGS. 3A and 3B illustrate exemplary flows of information between context server 200 and user device 205 according to two examples, and which may be referenced in combination with FIG. 2.

In one illustrative example, a user 227 operates a user device 205, e.g., a digital camera equipped mobile phone device. Device 205 generates a media object such as a digital photograph, which is transmitted to context-based service 220d as data 228 and context information 229. Context information 229 may include device-generated or user-generated metadata including information such as an identity of user 227 (or device 205), type or identification of device 205, location of capture, time of capture, location of the subject of the photo, direction of the camera, identification of other users nearby (e.g., via Bluetooth IDs), or combinations thereof. In other examples, data 228 may include user-generated information (e.g., metadata tags, subjective characterizations, etc.,) associated with a media object and/or context information 229.

In this example, context-based service 220d communicates context information 229 to context server 200, which may store context information in context database 206. Association logic of context server 200 may associate information with data 228 and/or context 229 based, at least in part, on context information 229. In other examples, data 228 and context 229 may be communicated directly to context server 200 (see, e.g., FIG. 3A), which may transmit a portion or all of such data to context-based service 220d, and further, may query a context interpreter 207a before or after transmitting information to context based service 220d. In yet other examples, data 228 and context 229 may be sent to different components; for example, data 228 transmitted to context based service 220a or context server 200 and context 229 transmitted to a context interpreter 207a-d.

Context-based service 220d may further communicate with context server 200, querying it for "real world" information (e.g., street address, city, etc.) of user 227 and/or device 205. In one example, context server 200 communicates context information 229 (or information associated with context information 229) to a context interpreter 207a; for example, communicating raw location information such as mobile cell ID, GPS information, or wireless access point location, and queries context interpreter 207a for city and street information. Context interpreter 207a may further utilize other information found in an associated or remote server 211a and its accompanying database 214a to determine street and city information that has been requested, and operate to return such information to context interpreter 207a. Additionally or alternatively, context information 229 may include and relate to the date, time of day, ambient conditions, biometric information related to the user, user/device ID, information related to a Personal Management Information (PIM) application or service, or combinations thereof, which may be determined or modified by context interpreter 207*a*. The information processed by context interpreter 207*a* is in turn communicated to context server 200, and may be used by the original requester, context-based service 220*d*. It is noted that in other examples, user device 205 may be capable of providing more complete context information 229, which does not require the use of a context interpreter 207*a*, or alternatively, context-based service 220*d* may include or access a context interpreter directly.

With information obtained from context server 200, context based-service 220*d* may upload data 228 to one or more information services 221*a-c* (for example, a photo storage service such as Yahoo!® Photos, Flickr®, or other photo storage service; a map service such as Yahoo!® Maps or the like; and so on), along with context information (e.g., location information) or other information associated with the data 228 and context information 229. The data may be stored in database 224*a-c*. Additionally, information may be communicated back to user device 205 (or one or more users other than user device 206 and user 227) via context server 200, context-based service 220*a-d*, or other service information service 221*a-c*.

In the example illustrated by FIG. 2, various components, e.g., context-based services 220*a-d* and context interpreters 207*a-d*, are illustrated as remote components (or external processes) to context server 200, and which may communicate via one or more Application Program Interfaces (API), such as APIs 202-204, as needed. Accordingly, the various devices or components may operate generally independently of each other and communicate in any fashion. In other examples, context server 200 may incorporate one or more of the components directly in its functionality and architecture; for example, within a common server system or backend (grouping of servers to support the described functions). For example, a context server may function without using a remote context interpreter or other information service, and operate generally as illustrated by FIG. 3B (where context server 200 includes logic for associating information or services from database 207 with client/device 205 based on the received context and/or data). A context server may further include logic for transferring associated data (as well as data 228 and context 229) to other information servers 221*a-c* for storage with associated databases 224*a-c*. A user 227 may then access the associated information or service via user device 205 or a different device. Additionally, context server 200 may transfer the associated information to user device 205 or another device directly.

Additionally, context server 200 is illustrated in this example as a single device for illustrative purposes; in other examples, various context servers are possible, wherein individual context servers are used for individual context-based services (e.g., a context server 220*a-d* per context-based service, e.g., relating to photos, advertisements, maps, travel guides, searches, games, and so on as will be described in greater detail below).

FIGS. 3A and 3B illustrate and contrast exemplary flows of information between two exemplary context servers 200*a*, 200*b* and client/device 205 according to two examples. FIG. 3A illustrates the flow of data between context server 200*a*, context interpreter 207, context-based service 220, and information server 221, all of which may be included as separate server systems in communication or within a common associated server system.

The flow of information is generally as described with respect to FIG. 2. For example, data and context information are received by context server 200. In one example, the context information may be interpreted by interpreter 207 and the interpreted context and data communicated to the context based service 220. The data and context may be transferred to an information server 221 and thereafter transferred or accessible to one or more users or user devices including, for example, client/device 205. For example, information server 221 may include a photo storage server, which is accessed by a user via client/device 205 or a different device.

In contrast, FIG. 3B illustrates the flow of data between client/device 205 and context server 200*b*, where context server 200*b* includes logic to carry out functions similar or identical to context interpreter 207, context-based service 220, and information server 221 of FIG. 3A or operates without such functions. Context server 200*b* may include interface logic for receiving data and context and association logic for associating information (e.g., from database 206) with a portion of the data based on the context. In both examples context server 200*a* and 200*b* may include interface logic for receiving context information as well as association logic for associating information based on the context information.

Figure 4:
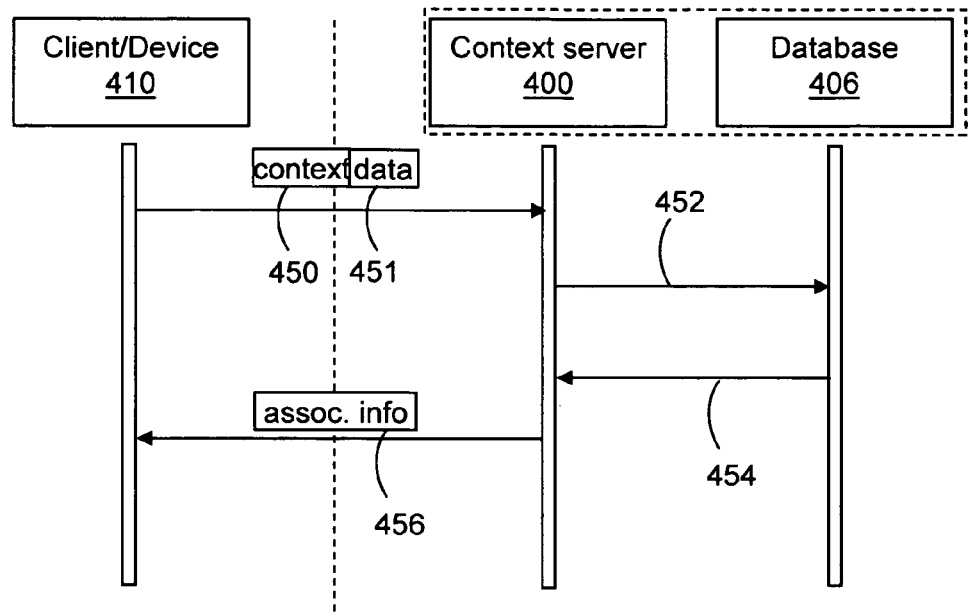
FIG. 4 illustrates an exemplary flow of information between a context server and a user device according to one example.

FIG. 4 illustrates information flow between a context server 400 and a client/user device 410 according to another example. In this example, context server 400 includes interface logic for receiving context information and user-generated information from a client/user device 410 and association logic for associating information with the user and/or user-generated information based on the context. In this example, client/user device 410 communicates context information 450 and data 451 (including user-generated information) to context server 400. The context information and user-generated information may be communicated to and received by context server 400 during a common session (e.g., during a media object capture, upload session, data transfer session, or the like). In other examples, the context information and user-generated information may be communicated within different session or at different times. Additionally, the context information and user-generated information may flow through other systems or servers prior to receipt by context server 400, such as mobile servers, service providers, and the like.

In one example, the user-generated information includes user-generated subjective characterization information. For example, the user-generated information may include a subjective characterization or rating regarding or interpreting the context (e.g., "this is great," "lousy weather," "beautiful day," or a ranking or scaled score of the context, i.e., between 1 and 10, and the like). The user-generated subjective characterization may be input to the user device via text or voice, and may include, e.g., selecting or ranking on a scale of 1-10 a subjective measure of the user's environment or state. In one example, the user-generated information or user-generated subjective characterization information may also be associated with a media object which may also be received by context server 400.

The context information 450 may include one or more of biometric information, time, location, ambient conditions, device or user ID, device type, user profile information, Personal Management Information (PIM) service information, and the like. Further, the context information may be transmitted to the context server through client/device 410 or from another device. For example, a cell ID might be determined by a wireless server and transmitted to context server 400 such that the context is not generated directly from the user device (nor is the context information communicated from the client/device 410)

Association logic of context server 400 operates to associate information or a service with the context information and user-generated information from database 406 as indicated by arrows 452 and 454. In particular, a portion or all of data received (e.g., context information 450 and data 451) may be used to associate information, and retrieve the associated information from database 406 via 452 and 454. Database 406, and associated information 456, may be stored locally or remotely to context server 410 and communicated to or accessibly by client/device 410 from context server 400 (as shown) or from a remote source. Additionally or alternatively, the service information may be communicated to one or more server systems or client devices other than the client device related to the context and user-generated information communicated via context 450 and data 451.

Context server 400 may further include or communicate with various other components (e.g., an interpreter, context-based service, database, advertisement server) and may communicate context information and user-generated information with remote components; further, the service information or services may be communicated to client/device 410 via a remote, third-party source.

Figure 5:
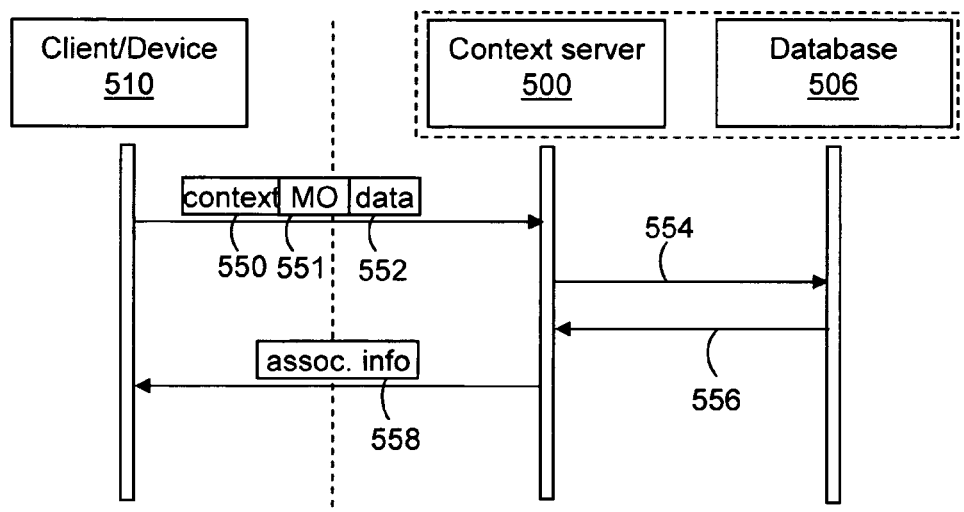
FIG. 5 illustrates an exemplary flow of information between a context server and a user device according to one example.

FIG. 5 illustrates an exemplary information flow between a context server 500 and client/device 510, the context server 500 including logic for associating information with a media object based, at least in part, on context information. In one example, client/user device 510 communicates context information 550, a media object 551, and user-generated information 552. For example, a user takes a picture with client/user device 510 and adds a tag such as a title associated with the picture (i.e., adds user-generated information 552). Client/user device 510 may automatically generate context information 550 for inclusion with the metadata of the picture (e.g., with an EXIF header). The context information 550, media object 551, and user generated information 552 may be transferred to context server 500 (or transferred to a service such as Flicker®, which may include functionality similar to context server 510 or communicate at least a portion of the information to context server 510).

The context information 550, media object 551, and user-generated information 552 may be communicated to context server 500 during a common session (e.g., during a media object capture, an upload session, a data transfer session, or the like). In other examples, one or more of the context information, media object, and user-generated information may be communicated within different session or at different times. Additionally, one or more of the context information, media object, or user-generated information may flow through other systems or servers prior to receipt by context server 500.

The user-generated information may include information related to the media object. For example, user-generated information may include any information that is not device generated automatically (such as EXIF data, for example), and may include various subjective or objective information such as user entered tags, including comments, titles, and so on associated with the media object. The user-generated information may be input to the user device via text or voice, in response to device generated queries (e.g., the device may suggest a descriptive tag or title), or the like.

As previously described, the context information may include various types of context information such as biometric information, time, location, ambient conditions, device or user ID, device type, user profile information, and the like. Further, the context information may be transmitted to context server 500 from the client/device 510 or from another device.

Association logic included with context server 500 operates to associate service information or a service from database 506 as indicated by arrows 554 and 556. In particular, a portion or all of data received via 550, 551, and 552 by context server 500 may be used to associate information or services, and retrieve such information or services from database 506 via 554 and 556. The association may be based on one or more of the context information, user-generated information, or a media object. Database 506 and associated information or services may be stored locally or remotely to context server 510 and communicated to client/device 510 at 558 from context server 500 (as shown) or from a remote source. Additionally or alternatively, the service information may be communicated to one or more server systems or client devices other than the client device related to the context, media object, and user generated information.

Similar to context server 400, context server 500 may include various other components, e.g., as shown in FIG. 2; further, associated information may be communicated to a client/device 510 via a remote, third-party source such as an advertisement server or other service provider.

The association of information or services by association logic according to some of the examples described herein (for example, according to the examples of any of FIGS. 1-5) may include or relate to various information such as an advertisement (e.g., based on user input or context alone), a physical address (e.g., converted from GPS or cell ID information), a map, nearby locations (which may include goods, services, or persons), a map of nearby locations, and so on. Additionally, the association of information may relate to various services (based on, e.g., context information of one or more users) such as identifying other users, leaving keyed messages or media objects for other users, travel or route planning based on input of other users, tag suggestions, context based games (e.g., a scavenger hunt), and so on.

Additionally, information or service provided to a user via the context server may include information associated with input from or related to a plurality of users. For example, the context server or associated component or service may aggregate the context and/or input data from multiple users and store the information remotely or locally. The input form multiple users may be used to associate information and service as described.

In one example, associated information may relate to context based advertisements for communication to one or more users, the advertisements based, at least in part, on the context information. In particular, an advertisement may be communicated to a user device based on the location of the user device, time of day, ambient conditions, biometric information, or combinations thereof. The advertisement may relate to a nearby business or attraction such as a restaurant, bar, museum, park, entertainment event, and so on. The advertisement may further include coupons, discounts, and the like. In one example, the context server itself may include logic for communicating the advertisement to one or more user devices, in other example, the context server may communicate received information or associated information to an advertisement server, which in turn may communicate an advertisement to one or more users.

In one example, the associated information may relate to a sponsored search based on the context and user input. The user input may include, for example, a search query by the user (as well as user-generated information or transferred media objects). A user may search for points of interest, restaurants, etc., from a user device, and the context server may associate information based on the input data (e.g., the search query terms) from the user device. The associated information may include or be used to provide a relevant advertisement via a sponsored search. Additionally, an associated advertisement may be associated based on the context and user-generated information or a media object in a similar fashion.

In one example, an associated information or service may relate to empirical information such as a map. A map, which may be retrieved from a map server or service provider, may be associated with the context information of the user device. In one example, an associated map may further include various points of interest, advertisements, and so on for display therewith, the points of interest generated based on information received from a user device such as context information, user-generated information, or a media object.

In one example, the associated information or service may relate to a travel map that indicates where other users or tours traveled in a similar location. For example, a travel map may be generated or associated that displays locations other users visited when in Rome, a map of popular restaurants, and so on. A travel map may include information from multiple users, e.g., such as context information and user-generated information, and may further be filtered or biased by the particular user receiving the travel map. A user may have associated social contacts (friends, user groups etc.), a user profile, and the like that may be used to generate the travel map. For example, instead of displaying a map where most people visit, displaying a map where social contacts visit, where active people visit, where wine connoisseurs visit, where people from San Francisco visit, etc. Further, the maps may be generated from both user input data as well as non-user data, e.g., from travel sites, travel guides, on-line forums, or the like.

Additionally, a travel map may be dynamic and current, e.g., displaying where people currently are located. For example, a user may receive a map of local bars indicating which bars are crowded as determined by context information received from other users. Similarly, the information may be filtered based on social contacts, user profiles, and the like such that a map is generated displaying local bars in which a user's social contacts are present. The data of where people are or have visited may be generated from other user's using a common or similar context server, or may be derived from other sources such as third party sources.

Various other maps are possible, e.g., including maps related to nearby banks, using travelers' checks, indicating businesses that speak a user's native language, historical events and places, current events, alerts regarding nearby landmarks, restaurants, events, warnings of travel hotspots (e.g., travel advisories, such as civil or military unrest, high crime areas, disease outbreaks, natural disasters, severe weather, etc.), and so on.

In another example, the associated information or service may relate to providing local intelligence to a user that is traveling or in unfamiliar surroundings. The context and/or user-generated data of a user may be used to determine that a user is traveling or outside of the user's local experience. For example, a user profile may include a residence address of San Francisco, Calif., and the context information indicates the user is in Munich, Germany; alternatively, a user's PIM applications/services including, e.g., a personal calendar, may indicate they are traveling. From this, information or services may be associated and available to the user relating, for example, to a local person, group, or location (e.g., a visitor booth) that may provide helpful information or assistance to a user. In one example, local information may be leveraged from Internet resources, such as Yahoo! Local™ or similar, to provide relevant information to the user. For example, as context information (e.g., spatial or geographical information) changes, the appropriate Yahoo! Local™ resources (such as maps, phonebooks, etc) may be available via the user device.

Additionally, the associated information or service may relate to PIM applications, and in one example, for updating or modifying PIM applications or data based on the context. For example, an out of office message may be activated if the user is determined to be out of the office or traveling based on the context. Further, a user's calendar, contacts, or the like may be updated based on context (e.g., work versus personal information, city A versus city B information, weekday versus weekend information, and so on).

In another example, the associated information or service may relate to guide information (e.g., a travel guide or tour) to a user while traveling. In one example, a user may be provided with a suggestion based, at least in part, on context information. Additionally, based on the context and other information received or available to the context server (e.g., user-input information, profile information, or the like), travel guides or tours may be generated. A generated tour may be based on current location, available time, transportation preferences/requirements, travel patterns of other related or unrelated travelers, and the like. Further, tours or suggestions may adapt to a user based on a user's mood (e.g., "I want something exciting" or "I want to relax"), or a user's mode (e.g., whether the user is traveling on business, family vacation, singles vacation, etc.). Additionally, the associated information or services may include an audio or video tour of a location, e.g., a city, park, museum, and the like.

In another example, the associated information or service may relate to information for acclimating a user to a foreign location. For example, a user device may be updated or loaded with information or services based on context, e.g., where the user device is located, the local time, customs, an associated calendar, and the like. In one example, a translation device or language primer based on the locale or future travel plans (which may retrieved from a calendar application, for example) may be provided or accessible to the user device. The translation device may include, for example, multilingual text-to-speech applications, as well as the use of media objects as translation guides. For example, the user device may display images (still or moving) or audio as guides, e.g., to navigate places, distinguish signs, locate food, and the like.

In one example, the associated information or service relates to suggested tags (subjective or objective) or media objects, the suggested tags or media objects based on context. The associated information may include tags or media objects from other users or sources of information and associated with a particular location or time. For example, if a user is determined to be at the Grand Canyon at 8 pm, the associated information might include a tag "Grand Canyon sunset." The suggested tag may be applied to a media object captured by the user. In another example, the user might be supplied with a photograph or audio/video tour of the Grand Canyon in response to the context information. Additionally, locations that are tagged frequently by users (or associated with frequent media object creation) may be indicated on a map as possible places of interest (as indicated by the number of tags or media objects associated therewith). Such a map may further be filtered based on social contacts, user profiles, context (e.g., for the time of day, time of year), and the like.

In another example, the associated information or service may relate to suggesting information or media objects associated with context. In particular, a context server may associate sample or suggested media objects based on a user's context (e.g., the location and time of a user) as well as other user-generated information. For example, a user on a trip may receive one or more photographs from other users or sources taken at the same or similar locations and similar or same time (e.g., both time of the year and time of the day). A user may fill holes in their photograph collection or use photographs determined to be superior than their own photographs.

In another aspect, associated information or service may relate to games and entertainment. In one example, the associated information or service may relate to a scavenger hunt (or similar) game. For example, a user may be supplied with a textual listing of a location (or a riddle that leads to said location), and asked to find the location. The user arriving at the desired location may be verified by context received from the user or user device (registered automatically or manually), or may require the user to capture a photograph (or other media object) associated with the location.

In another example, the associated information or service may be used as part of a reverse scavenger hunt game, wherein a user is supplied with a media object (e.g., a photograph) associated with a particular subject or location and asked to find the subject or location. Additionally, exemplary games such as a scavenger hunt or reverse scavenger hunt may be combined with marketing or advertising services. For example, a sponsored game to lead a user to particular store, restaurant, or other location, where the user may receive a prize or discount when they arrive.

In another example, the associated information or service relate to keyed messages or media objects. For example, a user may leave location and/or time keyed messages or media objects for other users to find (i.e., the message or media object is triggered by a portion of the context data). A keyed message or media object may be left for travelers and include various information such as tour guides, good spots for taking pictures, personal messages, public messages, and the like. When another user is in a location while traveling (restaurant, museum, monument, and so on) they can leave a text message or media object that will be available to other users that arrive (and our detected by the context server) at the location in the future.

In one example, keyed notes may have a brand sponsorship. For example, a location may be sponsored as a "Photo-Company A" picture spot, where information (e.g., an advertisement) associate with "Photo-Company A" is communicated to a user when the user is determined to be at the particular location. Additionally, the context server may guide a user to a particular location to take a good picture. For example, the user may be informed that there is a "Perfect picture spot" of an object 100 meters to the East of the current position. The picture spot may be chosen by many means, including as judged by expert photographers, how many other users have taken pictures from a given spot, arbitrarily chosen, and the like.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 6:
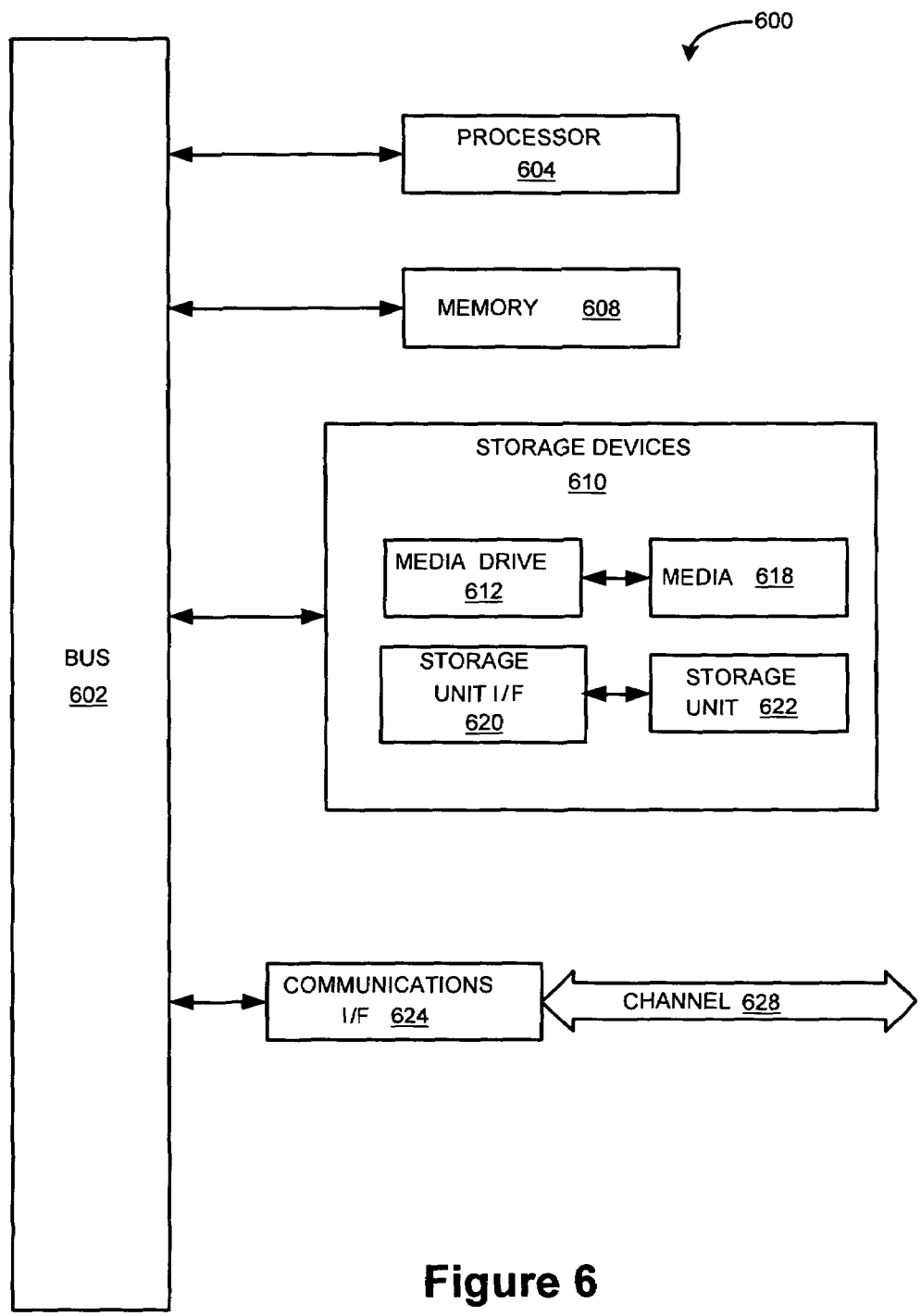
FIG. 6 illustrates an exemplary computing system that may be employed to implement processing functionality for various aspects of the invention.

FIG. 6 illustrates an exemplary computing system 600 that may be employed to implement processing functionality for various aspects of the invention (e.g., as a client device or a server device). Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, preferably random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage mechanism 610 may include other similar instrumentalities for allowing computer programs or other instructions or data to be loaded into computing system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical, or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 608, storage device 618, storage unit 622, or signal(s) on channel 628. These and other forms of computer-readable media may be involved in providing one or more sequences of one or more instructions to processor 604 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the present invention has been described in connection with some embodiments, it is not intended to be limited to the specific form set forth herein. Rather, the scope of the present invention is limited only by the claims. Additionally, although a feature may appear to be described in connection with a particular embodiment, one skilled in the art would recognize that various features of the described embodiments may be combined in accordance with the invention. Moreover, aspects of the invention describe in connection with an embodiment may stand alone as an invention.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. An apparatus comprising: a server computer comprising a processor and memory, the memory storing and the processor executing logic, the logic comprising: interface logic for: receiving a media object captured by at least one user device, the media object comprising image data; receiving context information, the context information comprising capture context information of the media object and current context information of a plurality of users, and receiving user-generated subjective characterization information associated with the context information; and association logic for associating service information, different from the context information, with the context information and the subjective characterization information of a user of the device and of the plurality of users; the service information comprising at least a type of service to be provided to the user associated with the user device, the type of service is automatically selected from a plurality of service types and is customized based on the current context information of at least a subset of the plurality of users other than the user associated with the user device.

2. The apparatus of claim 1, wherein the associated service information comprises empirical information.

3. The apparatus of claim 1, wherein the at least one user device comprises multiple user devices and the context information is received from the multiple user devices.

4. The apparatus of claim 1, wherein the context information comprises biometric information associated with the user.

5. The apparatus of claim 1, the memory further storing and the processor further executing service logic for providing the associated service information to at least one user based on the association of service information with the user-generated subjective characterization information or the context.

6. The apparatus of claim 5, wherein the at least one user comprises a second user other than a first user who created the user-generated subjective characterization information.

7. The apparatus of claim 6, the memory further storing and the processor further executing permissions logic for enabling the first user to grant the second user access to the service information.

8. The apparatus of claim 5, wherein the at least one user device comprises multiple user devices and the service information is based on a plurality of inputs from the multiple user devices.

9. The apparatus of claim 8, wherein the association logic is operable to associate the service information with user-generated subjective characterization information and context information from the multiple user devices.

10. The apparatus of claim 8, wherein the inputs comprise context information.

11. The apparatus of claim 8, wherein the inputs comprise user-generated subjective characterization information.

12. The apparatus of claim 5, wherein the service information relates to a scavenger hunt.

13. The apparatus of claim 5, wherein the service information relates to a scavenger hunt, the memory further storing and the processor further executing logic for providing a user device with a media object and requesting that the user find a location associated with the media object.

14. The apparatus of claim 5, wherein the service information relates to a travel log, the travel log comprising a map overlaid with at least one media object associated with the user.

15. The apparatus of claim 5, wherein the service information comprises a travel guide.

16. The apparatus of claim 15, the memory further storing and the processor further executing logic for providing a user device with a suggestion in response to user input and the context information.

17. The apparatus of claim 15, the memory further storing and the processor further executing logic for providing a user device with a tour.

18. The apparatus of claim 5, the memory further storing and the processor further executing logic for initiating a transfer of a context-based message to a user device in response to the context information.

19. The apparatus of claim 18, wherein the logic for initiating the transfer is operable to transfer the context-based message in response to a location of the user.

20. The apparatus of claim 5, the service information relating to an advertisement, the advertisement based on the context information.

21. The apparatus of claim 5, the service information relating to a sponsored search, the memory further storing and the processor further executing logic for initiating transfer to a user device of an advertisement based on the context information and a user search query received from the at least one user device.

22. The apparatus of claim 5, the memory further storing and the processor further executing logic for generating an away message based on the context information.

23. The apparatus of claim 5, the memory further storing and the processor further executing logic for providing information to a user based on user profile information.

24. The apparatus of claim 5, the memory further storing and the processor further executing logic for providing to the user device at least one user-created subjective characterization based on the context information.

25. A method comprising: receiving by at least one server computer from at least one user device: a media object captured by one of the at least one user device, the media object comprising image data; context information, the context information comprising capture context information of the media object and current context information of a plurality of users; user-generated subjective characterization information associated with the context information; and associating, by the at least one server computer, service information, different from the context information, with the context information and the subjective characterization information of a user of the device and of the plurality of users; the service information comprising at least a type of service to be provided to the user associated with the user device, the type of service is selected automatically from a plurality of service types and is customized based on the current context information of at least a subset of the plurality of users other than the user associated with the user device.

26. The method of claim 25, wherein the associated service information comprises empirical information.

27. The method of claim 25, wherein the at least one user device comprises multiple user devices and the context information is received from the multiple user devices.

28. The method of claim 25, wherein the context information comprises biometric information associated with the user.

29. The method of claim 25, further comprising directing the associated service information to at least one user based on the association of service information with the user-generated subjective characterization information or the context.

30. The method of claim 29, wherein the at least one user comprises a second user other than a first user who created the user-generated subjective characterization information.

31. The method of claim 29, wherein the at least one user device comprises multiple user devices and the service information is based on a plurality of inputs from the multiple user devices.

32. The method of claim 31, wherein the inputs comprise context information.

33. The method of claim 31, wherein the inputs comprise user-generated subjective characterization information.

34. The method of claim 29, wherein the service information relates to a scavenger hunt.

35. The method of claim 29, wherein the service information relates to a scavenger hunt, the method further comprising providing a user device with a media object and requesting that the user find a location associated with the media object.

36. The method of claim 29, wherein the service information relates to a travel log, the travel log comprising a map overlaid with at least one media object associated with the user.

37. The method of claim 29, wherein the service information comprises a travel guide.

38. The method of claim 37, further comprising providing a user device with a suggestion in response to user input and the context information.

39. The method of claim 37, further comprising providing a user device with a tour.

40. The method of claim 29, further comprising initiating a transfer of a context-based message to a user device in response to the context information.

41. The method of claim 40, wherein initiating the transfer is in response to a location of the user.

42. The method of claim 29, wherein the service information relates to an advertisement, the advertisement based on the context information.

43. The method of claim 29, wherein the service information relates to a sponsored search, the method further comprising initiating a transfer to a user device of an advertisement based on the context information and a user search query received from the at least one user device.

44. The method of claim 29, further comprising generating an away message based on the context information.

45. The method of claim 29, further comprising providing information to a user based on context information and user profile information.

46. The method of claim 29, further comprising providing to a user device at least one user-created subjective characterization based on the context information.

47. A computer-readable non-transitory storage medium encoded with computer program instructions that when executed by a server computer perform a process, the process comprising: receiving from at least one user device: a media object captured by one of the at least one user device, the media object comprising image data; context information comprising, capture context information of the media object and current context information of a plurality of users, and user-generated subjective characterization information associated with the context information; and associating service information, different from the context information, with the context information and the subjective characterization information of a user of the device and of the plurality of users; the service information comprising at least a type of service to be provided to the user, the type of service is automatically selected from a plurality of service types and is customized based on the current context information of at least a subset of the plurality of users other than the user associated with the user device.

48. The computer-readable non-transitory storage medium of claim 47, wherein the associated service information comprises empirical information.

49. The computer-readable non-transitory storage medium of claim 47, wherein the at least one user device comprises multiple user devices and the context information is received from the multiple user devices.

50. The computer-readable non-transitory storage medium of claim 47, wherein the context information comprises biometric information associated with the user.

51. The computer-readable non-transitory storage medium of claim 50, the process further comprising directing the associated service information to at least one user based on the association of service information with the user-generated subjective characterization information or the context.

52. The computer-readable non-transitory storage medium of claim 47, wherein the at least one user comprises a second user other than a first user who created the user-generated subjective characterization information.

53. The computer-readable non-transitory storage medium of claim 47, wherein the at least one user device comprises multiple user devices and the service information is based on a plurality of inputs from the multiple user devices.

54. The computer-readable non-transitory storage medium of claim 53, wherein the inputs comprise context information.

55. The computer-readable non-transitory storage medium of claim 53, wherein the inputs comprise user-generated subjective characterization information.

56. The computer-readable non-transitory storage medium of claim 47, wherein the service information relates to a scavenger hunt.

57. The computer-readable non-transitory storage medium of claim 56, wherein the service information relates to a scavenger hunt, the process further comprising providing a user device with a media object and requesting that the user find a location associated with the media object.

58. The computer-readable non-transitory storage medium of claim 56, wherein the service information relates to a travel log, the travel log comprising a map overlaid with at least one media object associated with the user.

59. The computer-readable non-transitory storage medium of claim 56, wherein the service information comprises a travel guide.

60. The computer-readable non-transitory storage medium of claim 59, the process further comprising providing a user device with a suggestion in response to user input and the context information.

61. The computer-readable non-transitory storage medium of claim 59, the process further comprising providing a user device with a tour.

62. The computer-readable non-transitory storage medium of claim 56, the process further comprising initiating a transfer of a context-based message to a user device in response to the context information.

63. The computer-readable non-transitory storage medium of claim 62, wherein initiating the transfer is in response to a location of the user.

64. The computer-readable non-transitory storage medium of claim 56, wherein the service information relates to an advertisement, the advertisement based on the context information.

65. The computer-readable non-transitory storage medium of claim 56, wherein the service information relates to a sponsored search, the process further comprising initiating transfer to a user device of an advertisement based on the context information and a user search query received from the at least one user device.

66. The computer-readable non-transitory storage medium of claim 56, the process further comprising providing information to a user based on context information and user profile information.

67. The computer-readable non-transitory storage medium of claim 56, the process further comprising providing to a user device at least one user-created subjective characterization based on the context information.

68. The apparatus of claim 1, wherein the service is selected from the plurality of service types based at least on one of a group consisting of the media object, the context information and the user-generated subjective characterization information.

* * * * *